United States Patent [19]

Gladstone

[11] Patent Number: 5,018,208
[45] Date of Patent: May 21, 1991

[54] INPUT DEVICE FOR DYNAMIC SIGNATURE VERIFICATION SYSTEMS

[76] Inventor: Karen S. Gladstone, 721 Avenue O, Brooklyn, N.Y. 11230

[21] Appl. No.: 503,375

[22] Filed: Apr. 2, 1990

[51] Int. Cl.$^5$ .............................................. G06K 9/00
[52] U.S. Cl. ............................................ 382/3; 382/13; 73/865.4; 178/18
[58] Field of Search ........................... 382/3, 59, 13; 73/432.1, 865.4, D4; 178/18

[56] References Cited

U.S. PATENT DOCUMENTS

| | | | |
|---|---|---|---|
| 3,528,295 | 9/1970 | Johnson et al. | 382/59 |
| 4,138,118 | 3/1979 | Budney | 273/186 A |
| 4,263,592 | 4/1981 | Takahashi | 178/18 |
| 4,896,543 | 1/1990 | Gullman | 382/3 |

*Primary Examiner*—David K. Moore
*Assistant Examiner*—David Fox
*Attorney, Agent, or Firm*—Kirschstein, Ottinger, Israel & Schiffmiller

[57] ABSTRACT

Finger pressure exerted by a writer's fingers on the barrel of a hand-held instrument is employed to dynamically verify a signature.

13 Claims, 2 Drawing Sheets

INPUT DEVICE FOR DYNAMIC SIGNATURE VERIFICATION SYSTEMS

BACKGROUND OF THE INVENTION

1. Field of the Invention

This invention generally relates to signature verification and, more particularly, to a hand-held input device that generates electrical output signals in response to an individual's action of writing his or her signature.

2. Description of Related Art

It is well known in the art of signature verification to use a special writing instrument and/or a special writing platen, either one or both of which produces electrical output signals in response to an individual's action of writing his or her signature. The output signals are dynamically representative of selected aspects of the handwriting action producing the signature. The output signals are compared to other output signals representative of past sample or exemplary signatures stored in a data bank such as a computer memory. Known computer programs compare the output signals currently generated on a real time basis when a signature is entered into a computer with those output signals previously stored in the computer memory. When this comparison effects a match within predetermined tolerances, then the computer identifies and accepts a valid signature. When the signatures do not match within predetermined tolerances, then the computer identifies and rejects a forgery.

There are several kinds of signature verification systems, each utilizing different inputs to generate the output signals. For example, U.S. Pat. No. 3,983,535 utilizes input signals proportional to accelerations of a writing stylus in one or two perpendicular directions. This acceleration information is obtained by computing the second derivative with respect to time of the displacement, in one or two directions, of the tip of the stylus.

Another kind of signature verification system is exemplified by U.S. Pat. No. 3,962,679 which utilizes input signals proportional to handwriting speed. U.S. Pat. No. 3,959,769 utilizes variable pressure exerted between a stylus tip and a writing surface by an individual during the course of writing one's signature. Another input device such as disclosed in U.S. Pat. Nos. 3,959,769 or 3,991,402 employs a magnetic transducer to sense displacement of a writing platen along a single direction. U.S. Pat. No. 4,078,226 employs a hand-held pen-shaped housing having piezo-electric transducers, each flexed by writing pressure during writing, each flexure being proportional to acceleration of the writing tip of the housing.

Other signature verification systems are disclosed, for example, in the following U.S. Pat. Nos.: 4,553,258; 4,040,012; 4,035,769; 4,286,255; 4,234,868; 4,495,644; 4,800,240; 4,757,549; 4,752,965; 4,724,542; 4,718,103 and 4,656,662.

Input devices for the known signature verification systems which employ writing styluses and/or platens which are sensitive to, among other things, handwriting pressure against the platen, displacement, velocity, acceleration, magnetic force, instrument flexure, and combinations thereof, have not proven to be altogether satisfactory in reliably screening signatures. It is, of course, essential that the verification system accurately screen signatures with total reliability, not only between an authorized individual and a forger, but also for an individual whose physical and/or mental faculties may be temporarily impaired, e.g. by alcohol or drugs.

SUMMARY OF THE INVENTION

1. Objects of the Invention

It is a general object of this invention to reliably and effectively screen handwritten patterns such as signatures.

It is another object of this invention to provide dynamic signature verification.

Another object of this invention is to produce output signals responsive to writing one's signature by sensing finger pressure exerted against a hand-held instrument.

A further object of this invention is to reliably distinguish signatures made between an individual and a forger, and between non-impaired and impaired states for an individual.

Still another object of this invention is to provide a durable, rugged, hand-held, input device that resists hand fatigue.

2. Features of the Invention

In keeping with these objects, and others which will become apparent hereinafter, one feature of this invention resides, briefly stated, in an input device for use in a dynamic handwritten pattern verification system, particularly for a signature verification system. The device comprises a housing having a hand-held barrel extending along an axis. Preferably, the housing is pen-shaped, and is constituted of a resilient material. Positioning means are provided on the barrel for positioning at least one finger, and preferably a plurality of fingers of a writer forming a handwritten pattern at respective preselected locations on the barrel.

Barrel pressure transducer means are provided for sensing radially-inwardly-directed finger pressure against the barrel during forming of handwritten patterns. At least one transducer, and preferably a plurality of transducers are located at the respective preselected locations in force-transmitting relationship with the respective fingers positioned thereat. Each transducer converts the radially-inwardly-directed pressure exerted by the finger on the barrel to an electrical output signal. Each output signal is, in turn, conducted away from the input device to the verification system.

I have recognized that finger pressure on the barrel of a writing instrument is variable and unique for each individual The pressure pattern is more distinctive than a fingerprint, and is not easily duplicated. Even if a forger can duplicate a signature with accuracy and speed, the forger cannot duplicate the invisible, semi-conscious pressure pattern that the original writer used in signing his or her signature during the very conscious act of forging.

In the preferred embodiment, each transducer is a piezo-electric transducer mounted within, and arranged circumferentially about, the barrel. The positioning means advantageously includes three finger-receiving grips adjacent a lower end region of the barrel. These grips are essentially depressions specially configured to repeatedly re-position one's thumb, forefinger and middle finger in the usual "tripod-like" writing configuration. By providing three piezo-electric transducers, one for each finger, multiple electrical output signals are generated, in contrast to those prior art approaches which utilize a single sensor in the tip of a writing instrument. In other words, there are more powers of discrimination produced by the input device of this invention.

Moreover, by sensing barrel pressure, the input device according to this invention can sense pressure even during those times when the writing instrument is lifted off a writing platen. Thus, the input device of this invention senses pressure between words or during the formation of certain letters, i.e. the dotting of an "i" or "j", or the crossing of a "t". This is a particularly valuable feature, given that much handwriting does show breaks (pen lifts) even between successive letters in the same word (i.e. all or some of the letters will not be joined to their neighbors), even in what appears to be a cursive style. Recent research places the incidence of within-word breaks in adult writers at over 80% of samples tested; hence, only a device that senses pressure during pen lifts can be reliable with the vast majority of the population.

It is advantageous if the housing is a light pen having a light sensor mounted at one end region of the barrel. A protective cover is mounted over the light sensor. The cover preferably has a generally planar writing surface spaced from the light sensor. The planar writing surface distributes the writing pressure over a broader surface, as compared to a pen tip which has a point-like writing surface. This resists writer's cramp and hand fatigue, and also prevents marring of the platen which is of particular benefit when the platen is a computer monitor screen.

The input device described herein has many and varied applications. It could serve to screen personnel desiring entry into a secured area. It could also screen between impaired and non-impaired states for an individual, thereby serving as an assurance that the individual is physically and mentally qualified to drive a car, fly an airplane, or perform any activity whatsoever. Such a screening process merely requires one to sign his or her name, and should not raise constitutional questions of the type now raised for urinalysis testing, breath analyzer testing or drug testing.

I am aware that other tests of manual input into a computer system are or can be developed, e.g. procedures to test capacity by requiring a certain level of performance on a coordination test resembling a video game However, such screening tests are not as useful as the invention herein described, for these reasons:

1. Since the activity is not unique to each individual, the performance test cannot also function as a method of user-ID entry and verification; hence, two log-on steps are required: a conventional log-on procedure, and then the capacity test. My method combines both in one step.

2. Since the activity is not unique to each individual, there exists a great likelihood of fraud, resulting from collusion among a group of users: e.g., in a workplace where the workers must take the coordination test to begin each day's work, it would be possible for one sober and fit employee to take the test for each of the other incapacitated users. Were signature verification (as herein described) to be used, this would not be possible, as the "passing grade" on the screening test, i.e., the writing and verification of an individual signature, would be unique to each user and not duplicatable by the other users.

3. Since the coordination test requires the users to engage in an activity not general in adult workday life (i.e., a video game), it is likely to breed resentment as something unfamiliar and irrelevant. The writing of a signature has no such connotations.

4. Since the coordination test holds each user to an externally imposed standard of capacity (passing marks on the game), users may well see it as a tool management can use to arbitrarily downgrade a set percentage of workers, e.g., by repeatedly raising the cut-off mark. With signature screening, the user is tested, not against management-specified efficiency levels applied to all, but against an individual indicator of his own performance when he is fit to perform.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENT

Figure 4:
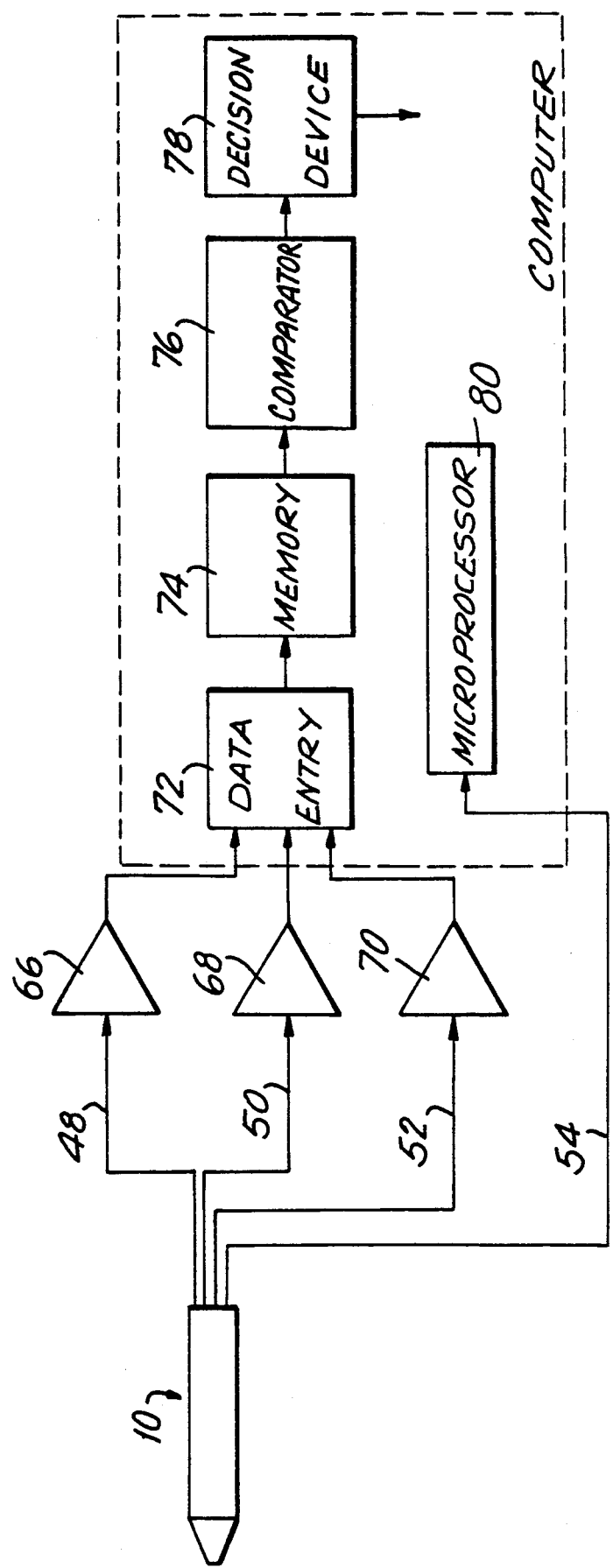
FIG. 4 is a schematic block diagram of the input device of FIG. 1 as used in a verification system.

Referring now to the drawings, reference numeral 10 generally identifies an input device for use in a dynamic handwritten pattern verification system of the kind generally depicted in FIG. 4 and identified by reference numeral 12. The device 10 includes a generally pen-shaped housing having a hand-held barrel 14 extending along an axis from a lower end or tip 16 to an upper end 18. The barrel 14 is constituted of a flexible resilient material such as synthetic plastic material or rubber.

Figure 1:
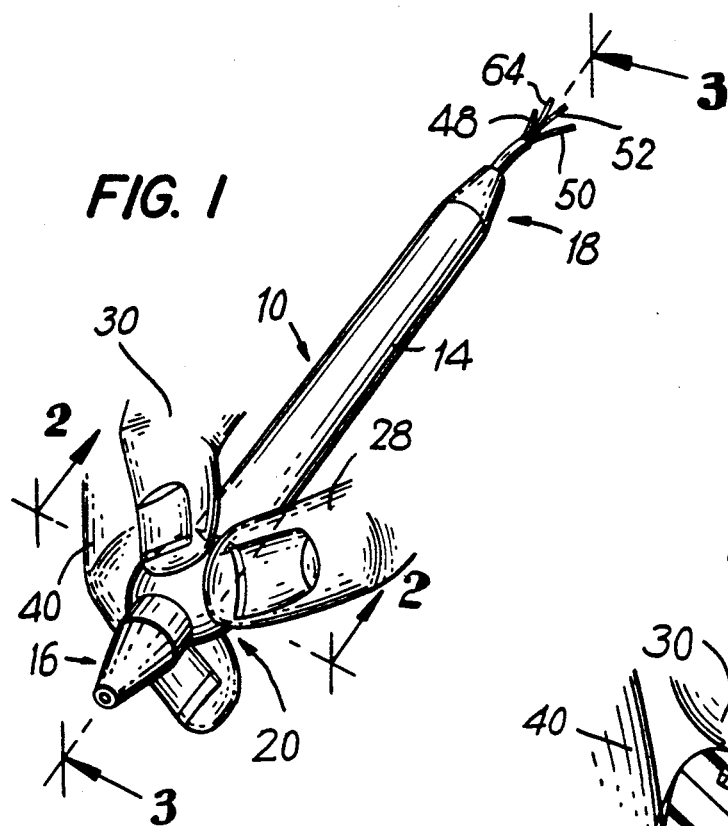
FIG. 1 is a front perspective view of an input device according to this invention during the act of forming a handwritten pattern.
Figure 2:
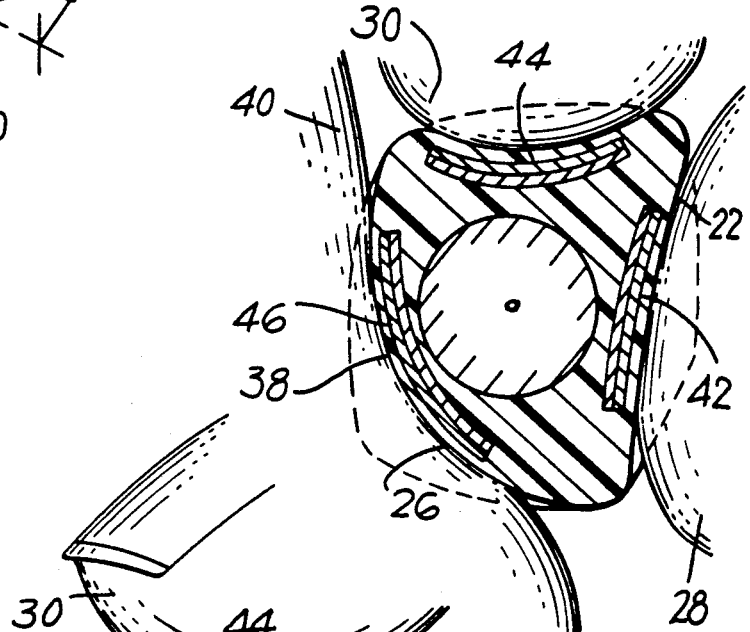
FIG. 2 is an enlarged sectional view taken on line 2—2 of FIG. 1.

A positioning aid 20 is mounted on the barrel 14 adjacent the lower end 16 thereof. The aid 20 serves to position at least one finger, and preferably three fingers of a writer forming a handwritten pattern at respective preselected locations on the barrel. The aid 20 preferably includes three finger-receiving grips or depressions 22,24,26. As best shown in FIG. 2, depression 22 receives a thumb tip 28; depression 24 receives a forefinger tip 30; and depression 26 receives the lower knuckle region 32 of the middle finger 40. As illustrated in FIG. 1, the thumb, forefinger and middle finger are configured in the normal tripod-like writing arrangement.

Although the drawings depict a right hand, the positioning aid is adapted to left- as well as right-handed use. For left-handed use, depression 22 would receive a forefinger tip, depression 24 would receive a thumb tip, and depression 26 would receive the lower knuckle region of the middle finger as before.

The aid 20 may either be discretely mounted on the barrel 14, or may be integrally molded thereon. U.S. Pat. No. 4,526,547, the entire contents of which are incorporated herein by reference, describes the aid 20 in more detail. The aid is preferably constituted of a flexible resilient material, such as plastic or rubber, to enable finger pressure exerted by the writer's fingers to be transmitted through the aid 20.

In accordance with this invention, barrel pressure transducer means are provided for sensing radially-inwardly-directed finger pressure against the barrel during forming of the handwritten pattern or signature. At least one transducer, and preferably a plurality of transducers 42, 44, 46 are located at the preselected locations in force-transmitting relationship with the fingers respectively positioned thereat. As best shown in FIG. 2, transducer 42 is embedded within the aid 20 slightly below the outer surface of the depression 22; transducer 44 is embedded within the aid 20 slightly below the outer surface of the depression 24; and transducer 46 is embedded within the aid 20 slightly below the outer surface of the depression 26.

Each transducer is preferably a bi-morph or a multi-morph piezo-electric transducer. This type of transducer requires no separate power source, but produces or generates its own output signals in accordance with flexure exerted on it by the fingers. Thus, during writing, the transducers convert radially-inwardly-directed pressure exerted by the fingers on the barrel to respective electrical output signals, each of which is conducted along discrete wires 48, 50, 52 to the verification system 12. The piezo-electric material used in the preferred embodiment is Gulton G-1195 or G-1278. Other piezo-electric materials having similar properties may also be used.

As further shown in FIG. 2, the transducers 42, 44, 46 are arranged circumferentially about the barrel. These transducers are operative at all times, including when the tip 16 is lifted off a platen 54.

Figure 3:
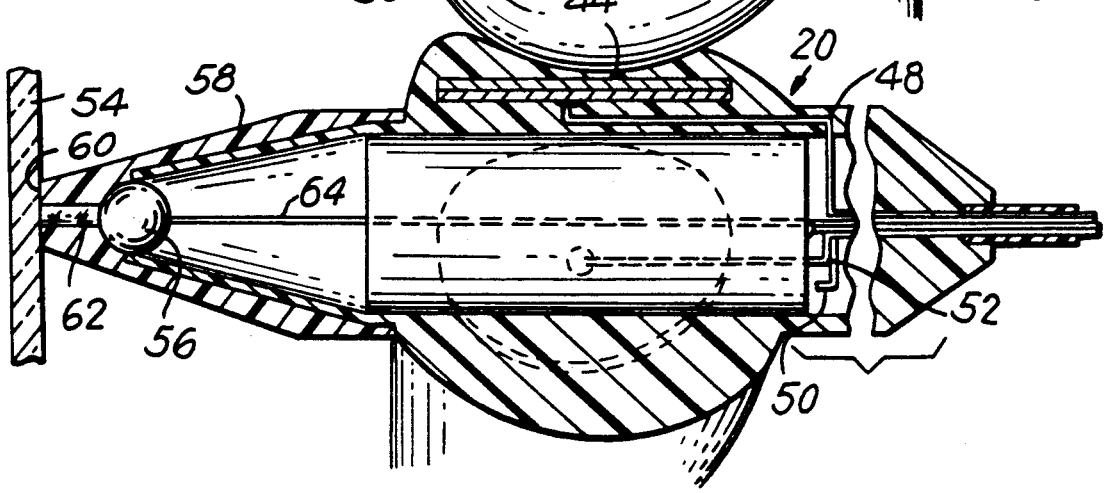
FIG. 3 is a broken-away sectional view taken on line 3—3 of FIG. 1.

As best shown in FIG. 3, the platen 54 is a light screen of a computer monitor, in which event, the housing is a light pen having a light sensor 56 mounted at the tip 16. The light pen may advantageously be Model LP-710 made by Information Control Corp. of Los Angeles, Calif. The light pen, when used on a cathode ray tube screen 54 reports to a computer connected to the screen 54 the exact location of the pen on the screen. The computer then follows stored instructions to illuminate or extinguish the area on the screen that is being covered by the pen.

Rather than directly contacting the light sensor 56 against the screen 54 and marring the same, a protective cover or sheath 58 is mounted over the tip 16. The cover has a generally planar writing surface 60 situated away from the light sensor 56. An optical fiber 62 extends from the sensor to the writing surface 60. The writing surface glides over the screen and distributes downward writing pressure over a broad area, thereby resisting writer's cramp and screen damage.

The sensor 56 detects the presence or absence of light on that area of the screen overlaid by the writing surface, and generates a corresponding electrical video signal that is conducted away from the light pen by conductor 64 to a microprocessor 80 of the computer 12.

Reference is now made to FIG. 4 which schematically depicts how the input device of the invention may be utilized for dynamic signature verification with an exemplary signature verification system. As shown therein, wires 48, 50, 52 from the transducers are connected to signal conditioning amplifiers 66, 68, 70. The outputs of amplifiers 66, 68, 70 pass into a programmed general purpose or special hardwired computer 12 at data entry 72 and thereupon pass into a memory 74. Upon signature completion, the signals representative of the just completed signature are compared to stored signals from memory 74 in a comparator 76. A decision device 78 indicates whether or not signals representative of the writing dynamics of the just completed signature sufficiently match the corresponding signals representative of the dynamics of stored signatures in order to verify the writer's identity.

Myriad uses for the input device include use as a bank lock to gain/deny access to a bank vault; as a military security lock to gain/deny access of weapon systems to unauthorized individuals, e.g. terrorists; as an automobile lock to deny access to unauthorized operators or to impaired authorized operators; as a computer entry system to replace existing password, fingerprint, retinal scanning locks; as an automated teller machine (ATM) security device to control all banking functions such as deposit, withdrawal and check writing with a printed and signed hard copy of the transaction for bank records; as a locking device on mechanical linkages or mechanical devices used to sign and distribute payroll checks; as a means to permit and verify on-line signatures of documents prepared, transmitted and displayed by means of a computer system.

It will be understood that each of the elements described above, or two or more together, also may find a useful application in other types of constructions differing from the types described above.

While the invention has been illustrated and described as embodied in an input device for dynamic signature verification systems, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims I claim:

1. An input device for use in a dynamic handwritten pattern verification system, particularly for a signature verification system, comprising:
   (a) a housing having a hand-held barrel extending along an axis and terminating in a writing tip;
   (b) positioning means on the barrel adjacent the tip for positioning a plurality of fingers of one hand of a writer forming a handwritten pattern in a one-handed writing configuration at a plurality of preselected locations on the barrel;
   (c) barrel pressure transducer means for sensing radially-inwardly-directed writing pressure by said fingers against the barrel during forming of the handwritten pattern, including at least one transducer located at one of the preselected locations in a force-transmitting relationship with the respective finger positioned thereat to convert radially-inwardly-directed writing pressure exerted by the respective finger on the barrel to an electrical output signal; and
   (d) means for conducting the electrical output signal to the verification system.

2. The input device according to claim 1, wherein the housing is constituted of a resilient material.

3. The input device according to claim 1, wherein the housing is pen-shaped.

4. The input device according to claim 1, wherein the housing is a light pen having a light sensor mounted at the tip.

5. The input device according to claim 4, wherein the housing includes a protective cover mounted over the light sensor, said cover having a generally planar writing surface spaced from the light sensor, and means for conducting light between the writing surface and the light sensor.

6. The input device according to claim 1, wherein the transducer means includes a plurality of transducers respectively located at the preselected locations in force-transmitting relationship with the respective fingers positioned thereat.

7. The input device according to claim 1, wherein the positioning means includes three finger-receiving grips adjacent the tip.

8. The input device according to claim 1, wherein the positioning means is integrally formed with the barrel.

9. The input device according to claim 7, wherein the positioning means includes a thumb-receiving grip for receiving a thumb tip, a forefinger-receiving grip for receiving a forefinger tip, and a middle finger-receiving grip for receiving a lower knuckle region of the middle finger.

10. The input device according to claim 1, wherein the transducer is a piezo-electric transducer.

11. The input device according to claim 10, wherein the piezo-electric transducer is embedded in the barrel.

12. The input device according to claim 6, wherein the positioning means fixedly positions the thumb, forefinger and middle finger relative to the barrel during forming of the handwritten pattern, and wherein the transducer means includes three piezo-electric transducers mounted within, and arranged circumferentially about, the barrel.

13. The input device according to claim 1, wherein the tip is movable on and across a platen, and wherein the transducer means senses radially-inwardly-directed finger pressure against the barrel during lifting of the tip off the platen.

* * * * *